UNITED STATES PATENT OFFICE.

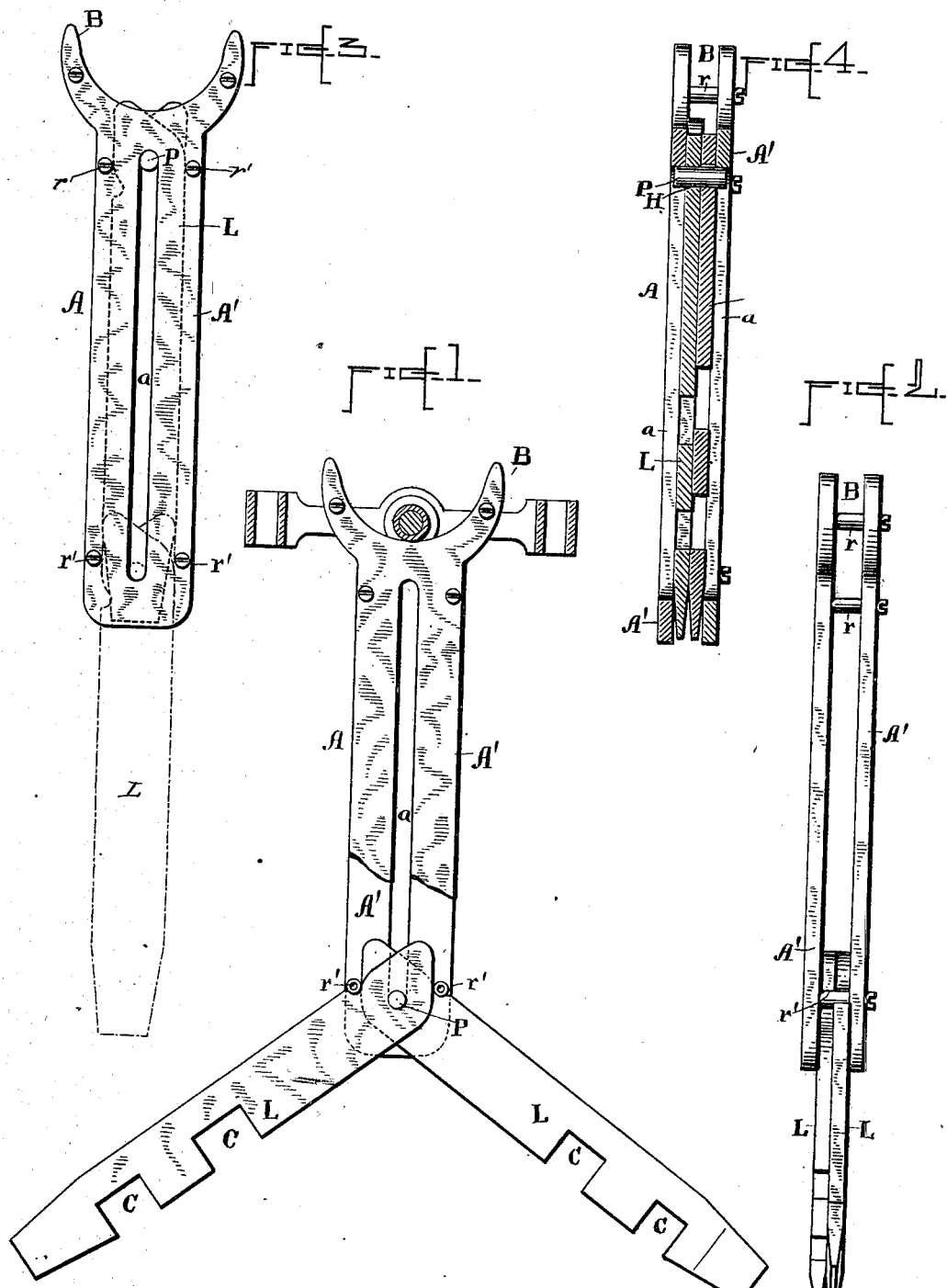

VIRGIL A. KREPPS, OF WHITE PLAINS, NEW YORK, ASSIGNOR TO JAMES W. KREPPS, OF BROOKLYN, NEW YORK.

BICYCLE-REST.

SPECIFICATION forming part of Letters Patent No. 669,462, dated March 5, 1901.

Application filed June 25, 1900. Serial No. 21,500. (No model.)

*To all whom it may concern:*

Be it known that I, VIRGIL A. KREPPS, a citizen of the United States, residing at White Plains, in the county of Westchester and State of New York, have invented certain new and useful Improvements in Bicycle-Rests, of which the following is a specification.

My invention relates to improvements in bicycle-rests, and in particular to that class of bicycle-rests which are not intended to be carried upon the bicycle, but which are adapted to be adjusted to the bicycle when at rest and to hold it in a substantially upright position, and is intended to provide a bicycle-rest adapted to be folded in small compass, conveniently carried in a tool-case or in a pocket, and to be readily adjusted to the bicycle. It is also intended to provide a bicycle-rest capable of use in emergencies as a tool.

In the drawings, Figure 1 represents a side view of the device adjusted to the left pedal of a bicycle, with the lower portion of the frame of the device cut away. Fig. 2 represents a rear elevation of the same device in the same position. Fig. 3 is a side view of the same device extended, but with the supporting-legs closed and indicated by dotted lines; and Fig. 4 represents the device folded for carriage in the pocket or tool-case, with a portion of the frame cut away.

The device consists of a support or frame A, made of two thin pieces of metal, as indicated in the drawings, furnished with a slot $a$ and carrying a crutch-bar B, preferably formed upon the frame A and inwardly recurved to be engaged by the axis of the bicycle-pedal. The two halves A' A' of the frame A are fixedly held parallel to each other by the rivets $r\ r$. The legs L L are connected with each other by the pin P, which is adapted to move vertically in the slots $a\ a$ in the frame A. When the device is adjusted to the pedal and the supporting-legs L L are spread, the legs L L are stopped and prevented from further spreading by the lower rivets $r'\ r'$. The legs L L may be furnished with recesses C C, adapted to be engaged by the different nuts on the bolts of the bicycle, thus making the device adaptable in emergencies as a wrench. The ends of the legs L L may be beveled to enable either leg to be used as a screw-driver.

Normally the legs L L are folded on the hinge-joint H, formed by the pin P and the legs L L, the pin P being pushed to the top of the slots $a\ a$, in which position the device may be readily carried in the tool-case or the pocket.

In operation the pin P is pushed to the bottom of the slot $a$, the legs are manually spread on the hinge-joint H, either pedal of the bicycle being brought substantially to a perpendicular at a point immediately below the crank-hanger, the rest, with the legs L L spread, as before described, is placed under the pedal, the axis of the pedal engaging with the crutch-bar B, and the bicycle is inclined slightly toward the side on which the rest has been adjusted. With such adjustment of the rest the bicycle will stand under ordinary conditions. When the bicycle is to be mounted and used, the rest is removed and the legs L L folded together and pushed upward into the frame A, the pin P traveling in the slots $a\ a$, and the legs L L being held together by the lower rivets $r'\ r'$.

What I claim as my invention, and desire to secure by Letters Patent, is as follows:

1. In a bicycle-rest, a frame comprising two parallel plates spaced a fixed distance apart by pins or rivets, having at its upper end a crutch-bar adapted for engagement with a bicycle-pedal, said plates each having a longitudinal slot therein, two of the spacing pins or rivets being arranged on opposite sides of the slot and near its lower end, and legs movably connected by a movable pin arranged to travel in said slots, said legs having their upper ends adapted to rest against one of said spacing pins or rivets when in extended position, and adapted to fold upon the movable pin and lie within said frame, substantially as described.

2. In a bicycle-rest, a frame comprising two parallel plates spaced a fixed distance apart by pins or rivets, having at its upper end a crutch-bar adapted for engagement with a bicycle-pedal, said plates each having a longitudinal slot therein, two of the spacing pins or rivets being arranged on opposite sides of the slot and near its lower end, and legs each consisting of a flat plate, movably connected by a movable pin arranged to travel in said slots, said legs having their upper ends adapted to rest against one of said spacing
5 pins or rivets when in extended position and adapted to fold upon the movable pin and lie within said frame, one of said legs being provided with recesses in its edge adapted to engage nuts or bolt-heads, substantially as described.

VIRGIL A. KREPPS.

Witnesses:
JOHN F. KREPPS,
WM. W. FORD.